(12) United States Patent
Woods et al.

(10) Patent No.: US 11,040,664 B2
(45) Date of Patent: Jun. 22, 2021

(54) SUPPORT MEMBER FOR VEHICLE CENTER CONSOLE LID

(71) Applicant: Ford Global Technologies, LLC, Dearborn, MI (US)

(72) Inventors: Derren Woods, Plymouth, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 16/564,514

(22) Filed: Sep. 9, 2019

(65) Prior Publication Data

US 2021/0070229 A1 Mar. 11, 2021

(51) Int. Cl.
| | | |
|---|---|---|
| *B60R 7/04* | (2006.01) | |
| *E05F 5/02* | (2006.01) | |
| *B29C 45/14* | (2006.01) | |
| *B29L 31/30* | (2006.01) | |

(52) U.S. Cl.
CPC ............ *B60R 7/04* (2013.01); *B29C 45/1418* (2013.01); *E05F 5/022* (2013.01); *B29L 2031/3005* (2013.01); *E05Y 2201/224* (2013.01); *E05Y 2900/538* (2013.01)

(58) Field of Classification Search
CPC ........ B60R 7/04; E05F 5/022; B29C 45/1418; E05Y 2201/224; E05Y 2900/538; B29L 2031/3005
USPC ........................................................ 296/37.8
See application file for complete search history.

(56) References Cited

U.S. PATENT DOCUMENTS

| | | | | |
|---|---|---|---|---|
| 5,520,313 A | * | 5/1996 | Toshihide | .............. B60N 3/102 |
| | | | | 224/539 |
| 6,749,794 B2 | * | 6/2004 | Spengler | ............. B29C 37/0032 |
| | | | | 264/101 |
| 7,810,862 B2 | * | 10/2010 | Smith | ....................... B60R 7/04 |
| | | | | 296/24.34 |
| 2016/0003275 A1 | * | 1/2016 | An | ......................... B60N 2/793 |
| | | | | 403/322.4 |
| 2018/0022281 A1 | * | 1/2018 | Hatakeyama | ............. E05D 7/10 |
| | | | | 220/811 |

FOREIGN PATENT DOCUMENTS

| | | |
|---|---|---|
| CN | 204235812 U | 4/2015 |
| JP | H07179151 A | 7/1995 |
| JP | 2014151807 A | 8/2014 |
| KR | 20130003709 U | 6/2013 |

\* cited by examiner

*Primary Examiner* — Pinel E Romain
(74) *Attorney, Agent, or Firm* — David Coppiellie; Price Heneveld LLP (57) ABSTRACT

A center console for a vehicle includes a bin having a sidewall that defines an inner cavity. The sidewall has an interior surface and an exterior surface. A lid is rotatably coupled to the bin. The lid is operable between a lowered position enclosing the inner cavity and a raised position. The lid includes a body having a bottom surface. A support member is disposed on the bottom surface of the body. The support member includes a protrusion and a bumper. The protrusion and the bumper are coupled together via a connector.

20 Claims, 5 Drawing Sheets

SUPPORT MEMBER FOR VEHICLE CENTER CONSOLE LID

FIELD OF THE DISCLOSURE

The present disclosure generally relates to a center console. More specifically, the present disclosure relates to a support member for a lid of the center console.

BACKGROUND OF THE DISCLOSURE

Vehicles often have center consoles disposed between adjacent seats. The center consoles often include a door or cover that is operable between an opened position and a closed position. When in the closed position, the lid can rest upon a container of the center console.

SUMMARY OF THE DISCLOSURE

According to at least one aspect of the present disclosure, a center console for a vehicle includes a bin that has a sidewall that defines an inner cavity. The sidewall has an interior surface and an exterior surface. A lid is rotatably coupled to the bin. The lid is operable between a lowered position that encloses the inner cavity and a raised position. The lid includes a body that has a bottom surface. A support member is disposed on the bottom surface of the body. The support member includes a protrusion and a bumper. The protrusion and the bumper are coupled together via a connector.

According to another aspect of the present disclosure, a vehicle center console lid includes a body that has a top surface and a bottom surface. The bottom surface has a peripheral edge. A protrusion is coupled to the bottom surface of the body. The protrusion extends substantially perpendicular from the bottom surface of the body. The protrusion is disposed proximate the peripheral edge. A bumper is coupled to the bottom surface of the body. The bumper is disposed proximate the peripheral edge. A connector extends between the protrusion and the bumper. The protrusion and the bumper are coupled together via the connector.

According to another aspect of the present disclosure, a method of manufacturing a vehicle center console lid includes providing a first mold and a second mold and molding a body of a lid that has a top surface and a bottom surface in the first mold. The lid is positioned in the second mold. A support member is overmolded on the bottom surface of the lid. The second mold defines a first recess defining a protrusion and a second recess that defines a bumper. The first and second recesses are in fluid communication via a sprue.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
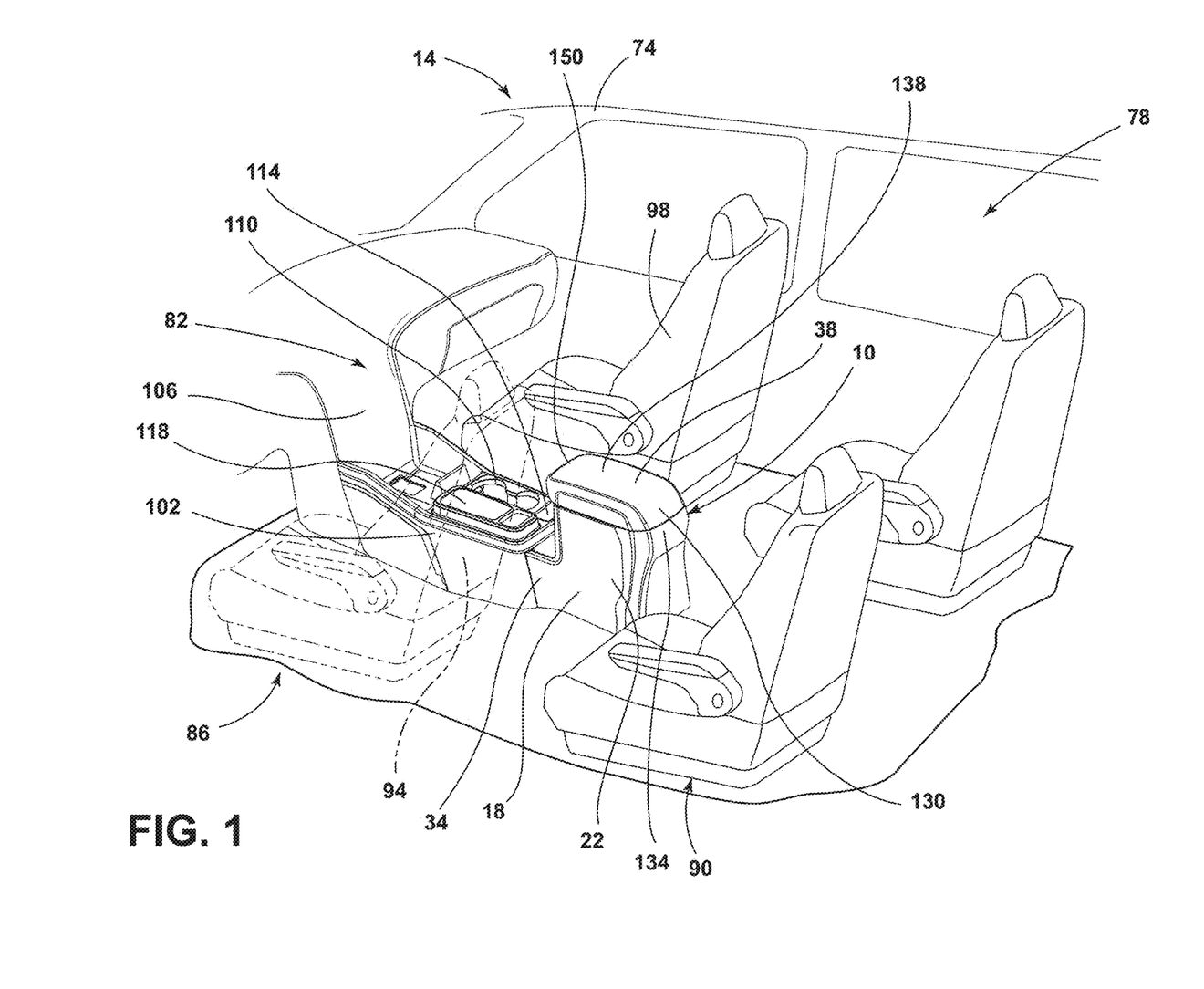
FIG. 1 is a partial side perspective view of a passenger compartment of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-7, reference numeral 10 generally refers to a center console for a vehicle 14 including a bin 18 having a sidewall 22 defining an inner cavity 26. The sidewall 22 has an interior surface 30 and an exterior surface 34. A lid 38 may be rotatably coupled to the bin 18. The lid 38 is operable between a lowered position 42, enclosing the inner cavity 26, and a raised position 46. The lid 38 includes a body 50 having a bottom surface 54. A support member 58 may be disposed on the bottom surface 54 of the body 50. The support member 58 may include a protrusion 62 and a bumper 66. The protrusion 62 and the bumper 66 may be coupled together via a connector 70.

Referring to FIG. 1, the vehicle 14 includes a vehicle body 74, which defines an interior 78 of the vehicle 14 having a passenger compartment 82 therein. The passenger compartment 82 may include a first seating row 86 and a second seating row 90. Fewer or more seating rows may be included in the vehicle 14 without departing from the teachings herein. The first seating row 86 may include a driver seat 94 and a passenger seat 98. The driver and passenger seats 94, 98 may be separated by the center console 10. The center console 10 may include the bin 18 and a cup holder assembly 102. The cup holder assembly 102 may extend between the bin 18 and an instrument panel 106 of the vehicle 14. The cup holder assembly 102 may define cup wells 110 and/or one or more receiving wells 114 for receiving other objects, such as electronics, keys, etc. The cup holder assembly 102 may also define one or more apertures 118 for receiving various controls for the vehicle 14.

Moreover, the vehicle 14 is a wheeled motor vehicle 14, which may be a sedan, a sport utility vehicle, a truck, a van, a crossover, and/or other styles of vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as ride-providing services (e.g., chauffeuring) and/or ride-sharing services.

Figure 2:
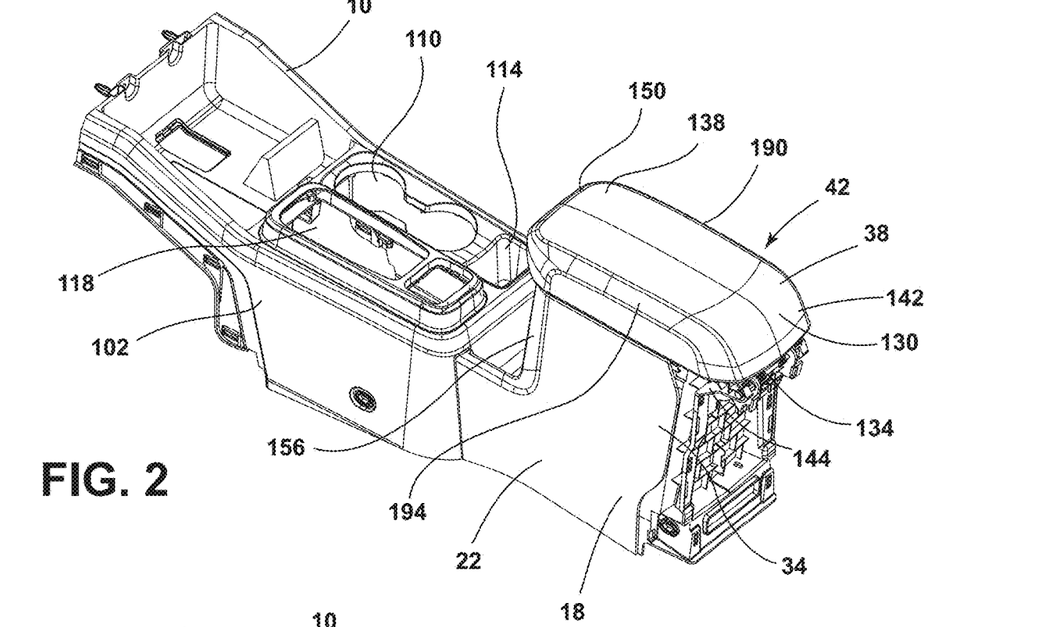
FIG. 2 is a side perspective view of a center console with a lid in a lowered position, according to one example.
Figure 3:
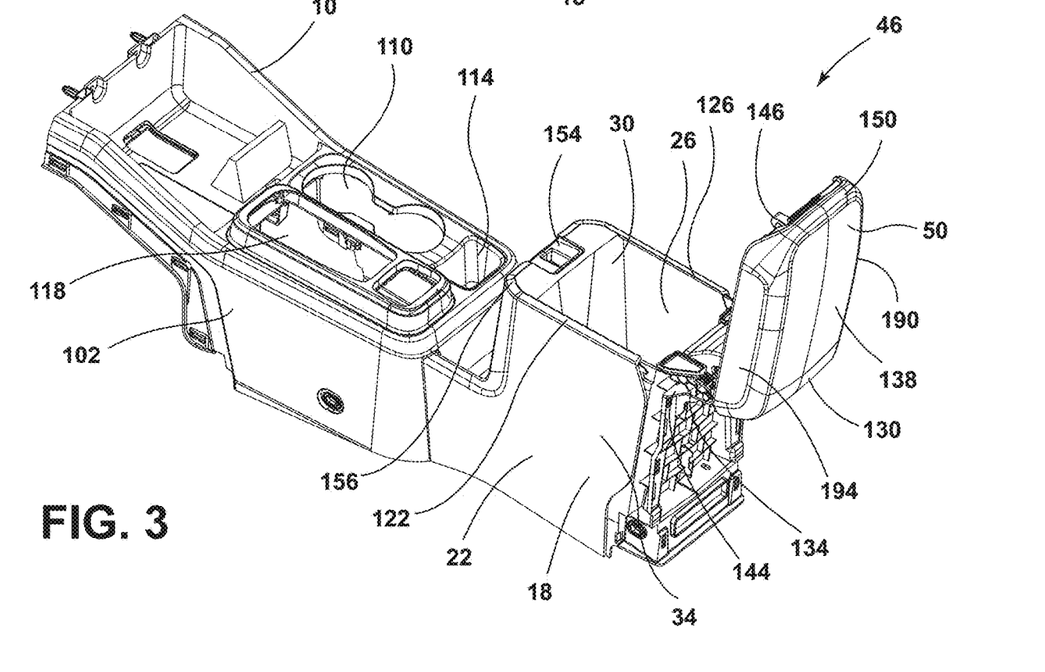
FIG. 3 is a side perspective view of a center console with a lid in a raised position, according to one example.

Referring to FIGS. 2 and 3, the center console 10 includes the bin 18 having the sidewall 22. The sidewall 22 may define the inner cavity 26 for providing storage space to passengers of the vehicle 14 (FIG. 1). The sidewall 22 includes an upper rim 122 defining an opening 126, which may provide access to the inner cavity 26. The opening 126 may define a substantially rectangular shape, which may correspond with a substantially rectangular cross-sectional shape of the bin 18. It is also contemplated that the bin 18 may have any practicable shape. Additionally or alternatively, the cup holder assembly 102 and/or the bin 18 may be any practicable size depending on the vehicle 14.

The lid 38 may rotate between the lowered position 42 (FIG. 2) and the raised position 46 (FIG. 3). In various examples, the center console 10 may include the lid 38 operably coupled to the bin 18. As illustrated in FIGS. 2 and 3, a rear portion 130 of the lid 38 may be rotatably coupled to a rear edge 134 of the bin 18. Additionally or alternatively, the rear portion 130 may be an edge of the lid 38 that couples to the sidewall 22 of the bin 18. As illustrated, the rear portion 130 is a vehicle-rearward edge of the lid 38. In this way, a pivot axis of the lid 38 may align with the rear edge 134 of the bin 18. However, based on the rotation of the lid 38, the rear portion 130 may be a vehicle-forward and/or lateral edge of the lid 38 that rotatably couples with the sidewall 22.

When in the lowered position 42, as illustrated in FIG. 2, the lid 38 may be disposed over the opening 126 of the inner cavity 26. The lid 38 may be supported by the upper rim 122 of the bin 18. In this way, the body 50 of the lid 38 may abut and/or be supported by the upper rim 122. In various examples, the lid 38 may include a cover 138 coupled to a top surface 142 of the lid 38. The cover 138 may be, for example, a padded layer, a cushion layer, and/or a decorative layer. This configuration may be advantageous for providing an armrest to the passengers in the driver and passenger seats 94, 98 of the vehicle 14 (FIG. 1). Further, when in the lowered position 42, the lid 38 may not interfere with access to the cup wells 110 and/or the receiving wells 114 of the cup holder assembly 102.

When in the raised position 46, as illustrated in FIG. 3, the lid 38 may extend substantially vertical. Additionally or alternatively, the raised position 46 may be substantially perpendicular to the lowered position 42. The raised position 46 of the lid 38 may provide the passengers with access to the inner cavity 26 of the bin 18. In various examples, the lid 38 may be offset from the rear edge 134 of the bin 18 when in the raised position 46. This may allow increased access to the inner cavity 26 of the bin 18 proximate the rear edge 134 of the bin 18. Stated differently, the pivot axis of the lid 38 may be offset from the rear edge 134 of the bin 18. In this way, the bin 18 may define a support extension 144 for coupling the lid 38 to the bin 18.

Referring still to FIGS. 2 and 3, the lid 38 may include a latch 146 on a front portion 150 thereof. The latch 146 may engage with a strike plate 154 disposed on the bin 18. As illustrated, the strike plate 154 is disposed on a front edge 156 of the console bin 18. However, based on the location where the lid 38 couples to the bin 18, the latch 146 and strike plate 154 may be disposed on different locations of the lid 38 and the bin 18, respectively. The latch 146 may retain the lid 38 in the lowered position 42 and may be disengaged by the passenger to allow the lid 38 to be moved to the raised position 46. The lid 38 may be manually moved between the raised and lowered positions 42, 46 or, alternatively, the movement may be automatic. Additionally or alternatively, the lid 38 may be biased towards one of the raised and lowered positions 42, 46.

Figure 4:
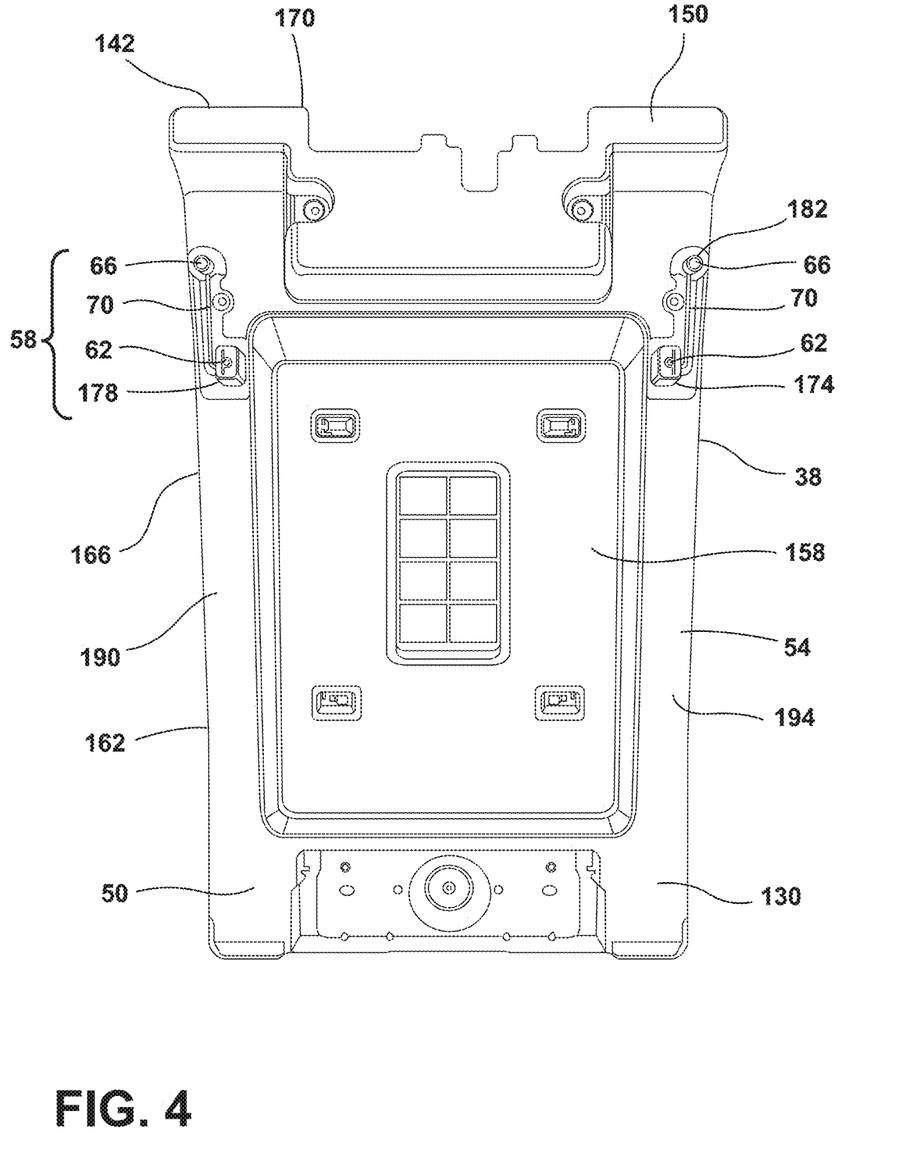
FIG. 4 is a bottom plan view of a lid of a center console having a support member, according to one example.

Referring to FIGS. 3 and 4, the lid 38 may include the body 50 having the bottom surface 54. The bottom surface 54 may be oriented towards the inner cavity 26 of the bin 18 when the lid 38 is in the lowered position 42 (FIG. 2). The bottom surface 54 may define a generally planar surface. Alternatively, the bottom surface 54 may define a depression 158. The depression 158 may be centrally located on the bottom surface 54 of the lid 38. The bottom surface 54 may have an A-surface and a B-surface. As used herein, the term "A-surface" refers to a surface of any component within the vehicle 14 that is visible and/or contactable by an occupant or passenger of the vehicle 14 when the component is in an assembled state. Contrastingly, the term "B-surface" refers to a surface of any component within the vehicle 14 that is concealed and/or non-contactable by the occupant or passenger of the vehicle 14 when the component is in an assembled state.

The support member 58 may be disposed on at least one of the A-surface and/or the B-surface of the bottom surface 54 of the body 50 of the lid 38. As illustrated in FIG. 4, the support member 58 is disposed on the A-surface of the lid 38. In this way, the support member 58 may be visible to the passenger of the vehicle 14 when the lid 38 is in the raised position 46 (FIG. 3) and may be obscured from the view of the passenger when the lid 38 is in the lowered position 42 (FIG. 2) (e.g., disposed in the inner cavity 26). The support member 58 may be disposed proximate a peripheral edge 162 of the bottom surface 54. Additionally or alternatively, the support member 58 may be disposed on the front portion 150 of the lid 38 proximate the peripheral edge 162 of the lid 38. In this way, the support member 58 may be disposed on an opposite side of the lid 38 relative to where the lid 38 couples to the bin 18 (e.g., the rear portion 130).

According to various aspects, both the protrusion 62 and the bumper 66 may be disposed proximate the peripheral edge 162 of the bottom surface 54. The protrusion 62 and the bumper 66 may be disposed proximate a front peripheral edge 170 and a side peripheral edge 166. The protrusion 62 may be disposed a first distance from a side peripheral edge 166 and the bumper 66 may be disposed a second distance from the side peripheral edge 166. In various examples, the first distance may be greater than the second distance, such that the protrusion 62 is more inwardly located on the bottom surface 54 than the protrusion 62 relative to the side peripheral edge 166. Additionally or alternatively, the protrusion 62 may be disposed a first distance from the front peripheral edge 170 of the bottom surface 54 and the bumper 66 may be disposed a second distance from the front peripheral edge 170, such that the protrusion 62 is more inwardly located than the bumper 66 with respect to the front edge 156. This configuration may be advantageous for supporting the lid 38 when the lid 38 is in the lowered position 42. In this way, the bumper 66 may abut the upper rim 122 (FIG. 3) of the bin 18 and the protrusion 62 may extend into the inner cavity 26 of the bin 18 when the lid 38 is in the lowered position 42.

Referring to FIGS. 2 and 4, the bumper 66 and the protrusion 62 may extend outward from the bottom surface 54, such that the protrusion 62 and the bumper 66 may extend substantially perpendicular to the bottom surface 54. When the lid 38 is in the lowered position 42, the bumper 66 may abut and/or rest upon the upper rim 122 of the sidewall 22 of the bin 18. Additionally or alternatively, the protrusion 62 may extend into the inner cavity 26 of the lid 38. A side surface 174 of the protrusion 62 may abut the interior surface 30 of the sidewall 22 of the bin 18. This configuration of the protrusion 62 may reduce side-to-side movement of the lid 38 when the lid 38 is in the lowered position 42. However, it is also contemplated that the side surface 174 of the protrusion 62 may be spaced-apart from the interior surface 30 of the sidewall 22.

Additionally or alternatively, the protrusion 62 may have a height that is greater than a height of the bumper 66. In this way, the lid 38 may provide a substantially horizontal surface (e.g., the cover 138) when in the lowered position 42 and with the bumper 66 resting upon the upper rim 122 of the sidewall 22 of the bin 18. Further, the protrusion 62 may extend into the inner cavity 26 for limiting side-to-side movement.

Referring again to FIG. 4, in various examples, the lid 38 may include a first support member 178 and a second support member 182. The first and second support members 178, 182 may be disposed proximate the peripheral edge 162 of the bottom surface 54 and/or may be disposed on the front portion 150 of the bottom surface 54. The first and second support members 178, 182 may be spaced-apart from one another. In this way, the first and second support members 178, 182 may be disposed on and/or extend from discrete portions of the bottom surface 54 of the lid 38. According to various aspects, the lid 38 may define the depression 158 at least partially between the first and second support members 178, 182. Stated differently, at least a portion of the depression 158 may be disposed between the first and second support members 178, 182.

According to various aspects, the first and second support members 178, 182 may be substantially mirror images of one another. As illustrated in FIG. 4, the first and second support members 178, 182 are generally L-shaped. The first support member 178 may be disposed on a first side 190 of the bottom surface 54 and the second support member 182 may be disposed on a second side 194 of the bottom surface 54. In this way, the first and second support members 178, 182 may at least partially extend inwards toward one another. The first and second support members 178, 182 are illustrated substantially in horizontal alignment with one another. However, it is contemplated that the first and second support members 178, 182 may be different sizes, and/or shapes, and/or disposed on different locations on the first and second sides 190, 194, respectively, without departing from the teachings herein.

Figure 5:
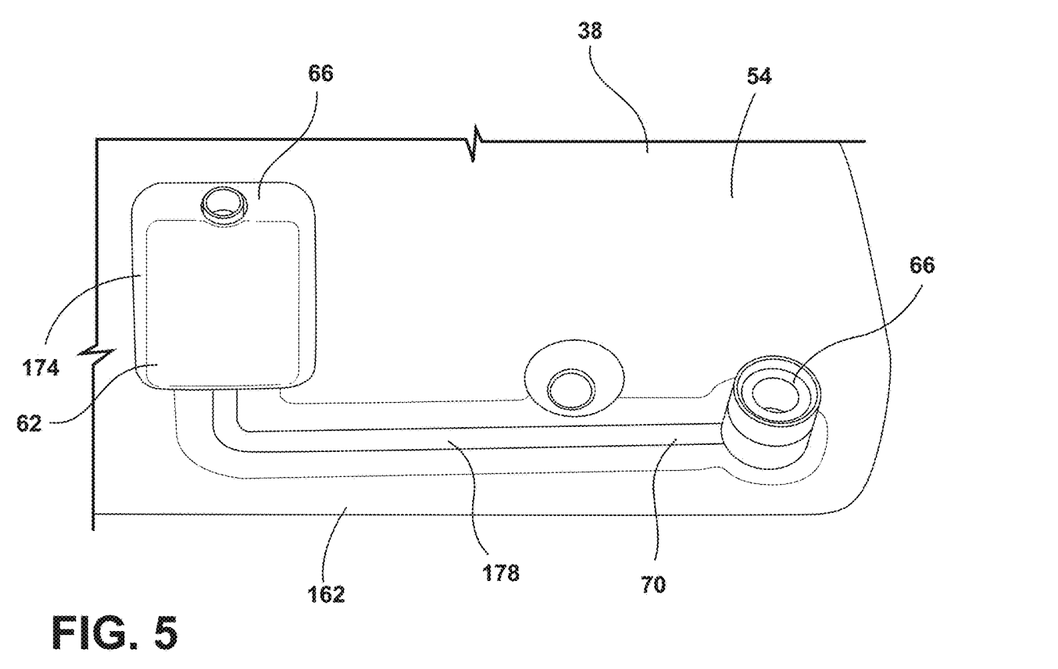
FIG. 5 is a top plan view of a support member, according to one example.

Referring to FIG. 5, the first support member 178 includes the protrusion 62 and the bumper 66 coupled together via the connector 70. The connector 70 extends outward towards the peripheral edge 162 of the bottom surface 54 from the side surface 174 of the protrusion 62. The connector 70 may then extend towards the front portion 150 of the bottom surface 54 and couple with the bumper 66. The connector 70 may be raised relative to the bottom surface 54 of the lid 38. Additionally, the connector 70 may be configured as a ridge, a rib, or another elongated and raised projection. According to various aspects, the connector 70 may be disposed on the bottom surface 54 of the lid 38. The connector 70 may extend along and abut the bottom surface 54. The entirety of the connector 70 may abut the bottom surface 54 or, alternatively, a portion of the connector 70 may abut the bottom surface 54. It is also contemplated that the connector 70 may be spaced-apart from the bottom surface 54, without departing from the teachings herein.

In various examples, the connector 70 may be integrally formed with at least one of the protrusion 62 and the bumper 66. Additionally or alternatively, the connector 70 may be integrally formed with both of the protrusion 62 and the bumper 66 to define a unitary first support member 178. Stated differently, the protrusion 62, the bumper 66, and the connector 70 extending therebetween may be a single, unitary component disposed on the bottom surface 54 of the lid 38. The first support member 178, including the protrusion 62, the connector 70, and the bumper 66, may include, for example, polymeric materials and/or elastomeric materials. Each of the protrusion 62, the connector 70, and the bumper 66 may include the same materials. In a specific example, the first support member 178 may include Santoprene™. The polymeric and/or elastomeric materials included in the first support member 178 may provide for a natural lubricity of the first support member 178.

Referring to FIGS. 2 and 5, the protrusion 62 including polymeric and/or elastomeric materials may be advantageous when the lid 38 is in the lowered position 42. As previously explained, the protrusion 62 may abut the interior surface 30 of the sidewall 22 of the bin 18. The natural lubricity of the polymeric and/or elastomeric materials may be advantageous for reducing noise, which may be caused by contact between the protrusion 62 and the interior surface 30 as the lid 38 moves side-to-side in the lowered position 42. The protrusion 62 may be advantageous for limiting the side-to-side motion of the lid 38 and the corresponding noise. The first support member 178 is illustrated in FIG. 5, however, it is contemplated that the second support member 182 (FIG. 4) may be similarly configured.

Figure 6:
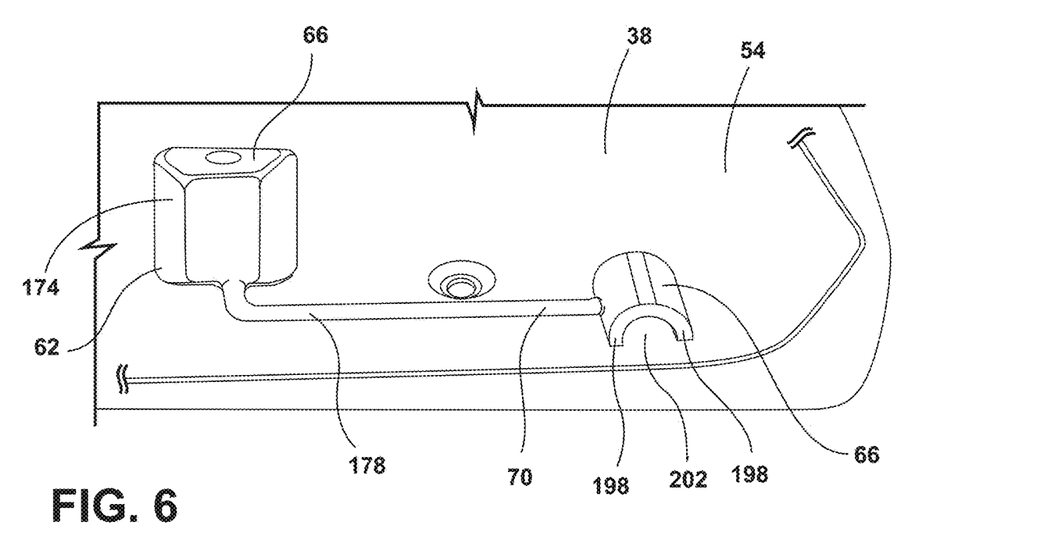
FIG. 6 is a top plan view of a support member according to one example.

Referring to FIGS. 5 and 6, the protrusion 62 and the bumper 66 may have a variety of configurations based on the selected configuration of the bin 18 and/or the vehicle 14. For example, as illustrated in FIG. 5, the protrusion 62 may have a substantially cuboid and/or truncated pyramid shape. As illustrated in FIG. 6, the protrusion 62 may have a substantially trapezoidal prism shape. Additionally or alternatively, the protrusion 62 may have, rounded edges, radiused edges, chamfered edges, sharp edges, and/or any other practicable configuration. However, it is contemplated that the protrusion 62 may have any practicable shape for limiting and/or reducing side-to-side movement of the lid 38 when in the lowered position 42 (FIG. 2).

Additionally or alternatively, the bumper 66 may have a substantially cylindrical and/or frusto-conical shape, as illustrated in FIG. 5. In various examples, as illustrated in FIG. 6, the bumper 66 may be configured as an arch, having to abutment portions 198 defining a gap 202 therebetween. The shape and/or size of the bumper 66 may depend on the selected configuration center console 10. According to various aspects, the bumper 66 may be tunable. In this way, the geometry of the bumper 66 and/or the materials of the bumper 66 may be adjusted to provide a selected durometer. The different geometries and/or materials may provide different properties to the bumper 66, such as, for example, shock-absorbing properties, resiliency, flexibility, stiffness, etc. The second support member 182 may be similarly configured.

Figure 7:
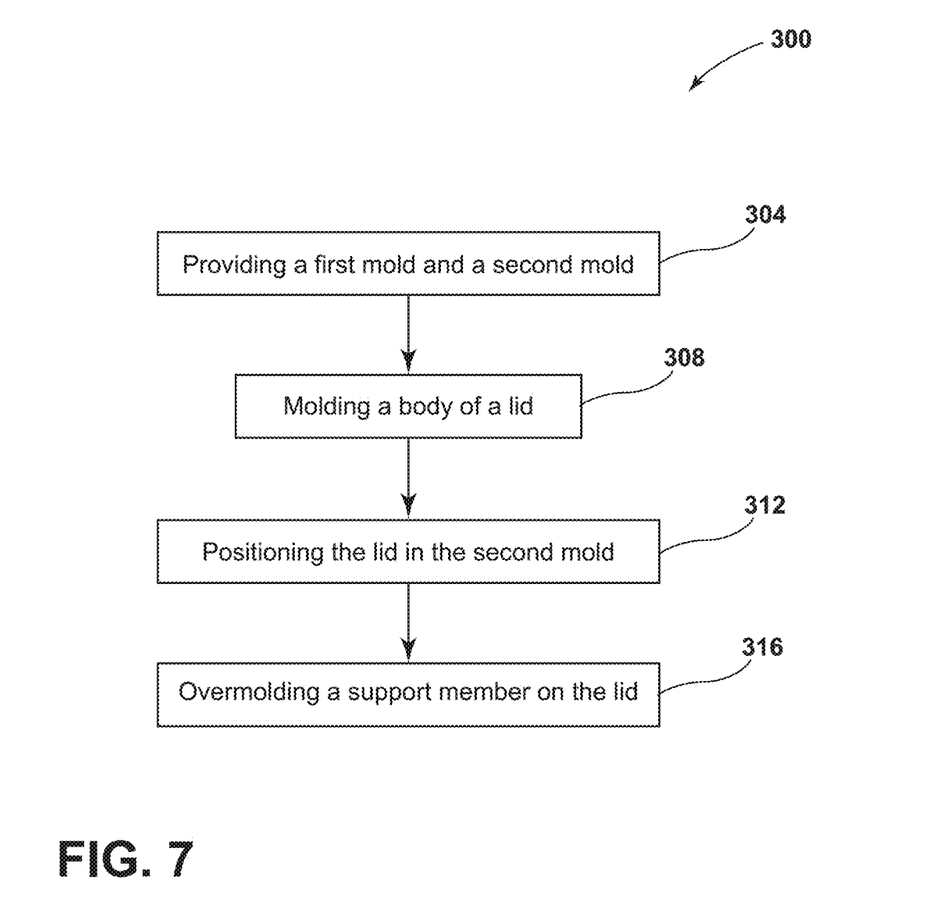
FIG. 7 is a flow chart of a method of manufacturing a vehicle center console lid.

Referring to FIG. 7, and with further reference to FIGS. 1-6, a method 300 of manufacturing the lid 38 of the center console 10 may include a step 304 of providing a first mold and a second mold. The first mold may correspond to the lid 38 of the center console 10 and the second mold may correspond to the support member 58. In a step 308, the body of the lid 38 may be molded in the first mold. According to various aspects, the polymeric and/or elastomeric materials may be injected into the first mold. The step 308 may also include cooling the body 50 of the lid 38.

In various examples, in a step 312, the lid 38 may be positioned in the second mold. The lid 38 may be manually positioned in the second mold or, alternatively, may be rotated into the second mold. In a step 316, the support member 58 may be overmolded onto the bottom surface 54 of the lid 38. The second mold may include a first recess for defining the protrusion 62 and a second recess for defining the bumper 66. The first and second recesses may be in fluid communication with one another via a sprue. The sprue may define the connector 70. According to various aspects, the polymeric and/or elastomeric material may be injected into the second mold. The polymeric and/or elastomeric materials may cool in the first and second depressions and the sprue to define the protrusion 62, the bumper 66, and the connector 70, respectively. The method 300 may be a two-shot injection molding of the lid 38 and the support member 58. It is also contemplated that the lid 38 and the support member 58 may be formed in a single mold. In such examples, the polymeric and/or elastomeric materials may be injected into the mold to form the lid 38. The mold may be opened and additional polymeric and/or elastomeric materials may be injected into the mold to form the support member 58.

Use of the presently disclosed device may provide a variety of advantages. For example, the protrusion 62 may limit the side-to-side movement of the lid 38 when in the lowered position 42. Also, the polymeric and/or elastomeric materials of the protrusion 62 may provide a natural lubricity for limiting noise from contact between the protrusion 62 and the interior surface 30 of the bin 18. Additionally, the bumper 66 may be tuned, such that the geometry and/or the durometer of the bumper 66 may be adjusted for the selected configuration of the lid 38. Moreover, the protrusion 62, the bumper 66, and the connector 70 may form a unitary support member 58. The unitary support member 58 may improve the aesthetics of the lid 38. Further, the unitary support member 58 may reduce the number of parts for manufacturing and, as such, may reduce production costs and time. Additional benefits or advantages of using this device may also be realized and/or achieved.

According to various examples, a center console for a vehicle includes a bin that has a sidewall that defines an inner cavity. The sidewall has an interior surface and an exterior surface. A lid is rotatably coupled to the bin. The lid is operable between a lowered position that encloses the inner cavity and a raised position. The lid includes a body that has a bottom surface. At least one support member is disposed on the bottom surface of the body. The at least one support member includes a protrusion and a bumper. The protrusion and the bumper are coupled together via a connector. Embodiments of the present disclosure may include one or a combination of the following features:

- at least one support member includes a first support member disposed on a first side of the bottom surface and a second support member disposed on a second side of a bottom surface;
- a bottom surface defines a depression at least partially between first and second support members;
- a side surface of a protrusion abuts an interior surface of a bin when a lid is in a lowered position;
- at least one support member is disposed proximate a front portion of a bottom surface;
- a protrusion, a bumper, and a connector are integrally formed with one another. The protrusion, the bumper, and the connector include polymeric materials;
- a protrusion is disposed a first distance from a peripheral edge of a bottom surface and a bumper is disposed a second distance from the peripheral edge. The first distance is greater than the second distance;
- a connector is disposed on a bottom surface of a lid;
- at least one support member includes first and second support members. The first and second support members are spaced-apart from one another and disposed on discrete portions of a bottom surface; and first and second support members are substantially mirror images of one another.

According to various examples, a vehicle center console lid includes a body having a top surface and a bottom surface. The bottom surface has a peripheral edge. A protrusion is coupled to the bottom surface of the body. The protrusion extends substantially perpendicular from the bottom surface of the body. The protrusion is disposed proximate the peripheral edge. A bumper is coupled to the bottom surface of the body. The bumper is disposed proximate the peripheral edge. A connector extends between the protrusion and the bumper. The protrusion and the bumper are coupled together via the connector. Embodiments of the present disclosure may include one or a combination of the following features:

a protrusion, a bumper, and a connector are disposed on a front portion of a body;

a protrusion has a height greater than a height of a bumper;

a protrusion is disposed a first distance from a peripheral edge and a bumper is disposed a second distance from the peripheral edge. The first distance is greater than the second distance;

a connector extends along and abuts a bottom surface of a body;

a connector is integrally formed with a protrusion and a bumper;

a connector, a protrusion, and a bumper define a unitary support member;

a bumper is configured as an arch; and a protrusion and a bumper are spaced-apart from one another and disposed on a rear portion of a first side of a bottom surface.

According to various examples, a method of manufacturing a vehicle center console lid includes providing a first mold and a second mold and molding a body of a lid that has a top surface and a bottom surface in the first mold. The lid is positioned in the second mold. A support member is overmolded on the bottom surface of the lid. The second mold defines a first recess defining a protrusion and a second recess defining a bumper. The first and second recesses are in fluid communication via a sprue.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, comprising:
   a bin having a sidewall defining an inner cavity, wherein the sidewall has an interior surface and an exterior surface;
   a lid rotatably coupled to the bin, wherein the lid is operable between a lowered position enclosing the inner cavity and a raised position, and wherein the lid includes a body having a bottom surface; and
   at least one support member disposed on the bottom surface of the body, wherein the at least one support member includes a protrusion and a bumper, and wherein the protrusion and the bumper are coupled together via a connector.

2. The center console of claim 1, wherein the at least one support member includes a first support member disposed on a first side of the bottom surface and a second support member disposed on a second side of the bottom surface.

3. The center console of claim 2, wherein the bottom surface defines a depression at least partially between the first and second support members.

4. The center console of claim 1, wherein a side surface of the protrusion abuts the interior surface of the bin when the lid is in the lowered position.

5. The center console of claim 1, wherein the at least one support member is disposed proximate a front portion of the bottom surface.

6. The center console of claim 1, wherein the protrusion, the bumper, and the connector are integrally formed with one another, and wherein the protrusion, the bumper, and the connector include polymeric materials.

7. The center console of claim 1, wherein the protrusion is disposed a first distance from a peripheral edge of the bottom surface and the bumper is disposed a second distance from the peripheral edge, and wherein the first distance is greater than the second distance.

8. The center console of claim 1, wherein the connector is disposed on the bottom surface of the lid.

9. The center console of claim 1, wherein the at least one support member includes first and second support members, and wherein the first and second support members are spaced-apart from one another and disposed on discrete portions of the bottom surface.

10. The center console of claim 9, wherein the first and second support members are substantially mirror images of one another.

11. A vehicle center console lid, comprising:
    a body having a top surface and a bottom surface, wherein the bottom surface has a peripheral edge;
    a protrusion coupled to the bottom surface of the body, wherein the protrusion extends substantially perpendicular from the bottom surface of the body, and wherein the protrusion is disposed proximate the peripheral edge;
    a bumper coupled to the bottom surface of the body, wherein the bumper is disposed proximate the peripheral edge; and
    a connector extending between the protrusion and the bumper, wherein the protrusion and the bumper are coupled together via the connector.

12. The vehicle center console lid of claim 11, wherein the protrusion, the bumper, and the connector are disposed on a front portion of the body.

13. The vehicle center console lid of claim 11, wherein the protrusion has a height greater than a height of the bumper.

14. The vehicle center console lid of claim 11, wherein the protrusion is disposed a first distance from the peripheral edge and the bumper is disposed a second distance from the peripheral edge, and wherein the first distance is greater than the second distance.

15. The vehicle center console lid of claim 11, wherein the connector extends along and abuts the bottom surface of the body.

16. The vehicle center console lid of claim 11, wherein the connector is integrally formed with the protrusion and the bumper.

17. The vehicle center console lid of claim 11, wherein the connector, the protrusion, and the bumper define a unitary support member.

18. The vehicle center console lid of claim 11, wherein the bumper is configured as an arch.

19. The vehicle center console lid of claim 11, wherein the protrusion and the bumper are spaced-apart from one another and disposed on a rear portion of a first side of the bottom surface.

20. A method of manufacturing a vehicle center console lid, comprising:
    providing a first mold and a second mold;
    molding a body of a lid having a top surface and a bottom surface in the first mold;
    positioning the lid in the second mold; and
    overmolding a support member on the bottom surface of the lid, wherein the second mold defines a first recess defining a protrusion and a second recess defining a bumper, and wherein the first and second recesses are in fluid communication via a sprue.

* * * * *